J. A. COYLE AND C. H. ROTH.
SCREENING MACHINE.
APPLICATION FILED JUNE 10, 1918.

1,319,925.

Patented Oct. 28, 1919.
3 SHEETS—SHEET 3.

Witnesses
Eva E. König
E. C. Wells

Inventors
Joseph A. Coyle
Charles H. Roth
By their Attorneys
Williamson & Merchant

UNITED STATES PATENT OFFICE.

JOSEPH A. COYLE AND CHARLES H. ROTH, OF MINNEAPOLIS, MINNESOTA.

SCREENING-MACHINE.

1,319,925.  Specification of Letters Patent.  Patented Oct. 28, 1919.

Application filed June 10, 1918. Serial No. 239,159.

*To all whom it may concern:*

Be it known that we, JOSEPH A. COYLE and CHARLES H. ROTH, citizens of the United States, residing at Minneapolis, in the county of Hennepin and State of Minnesota, have invented certain new and useful Improvements in Screening-Machines; and we do hereby declare the following to be a full, clear, and exact description of the invention, such as will enable others skilled in the art to which it appertains to make and use the same.

Our invention has for its object to provide an improved screening machine intended for general use, but especially adapted for use in screening ore, coal, sand, gravel, crushed stone and the like.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:—

Figure 1:
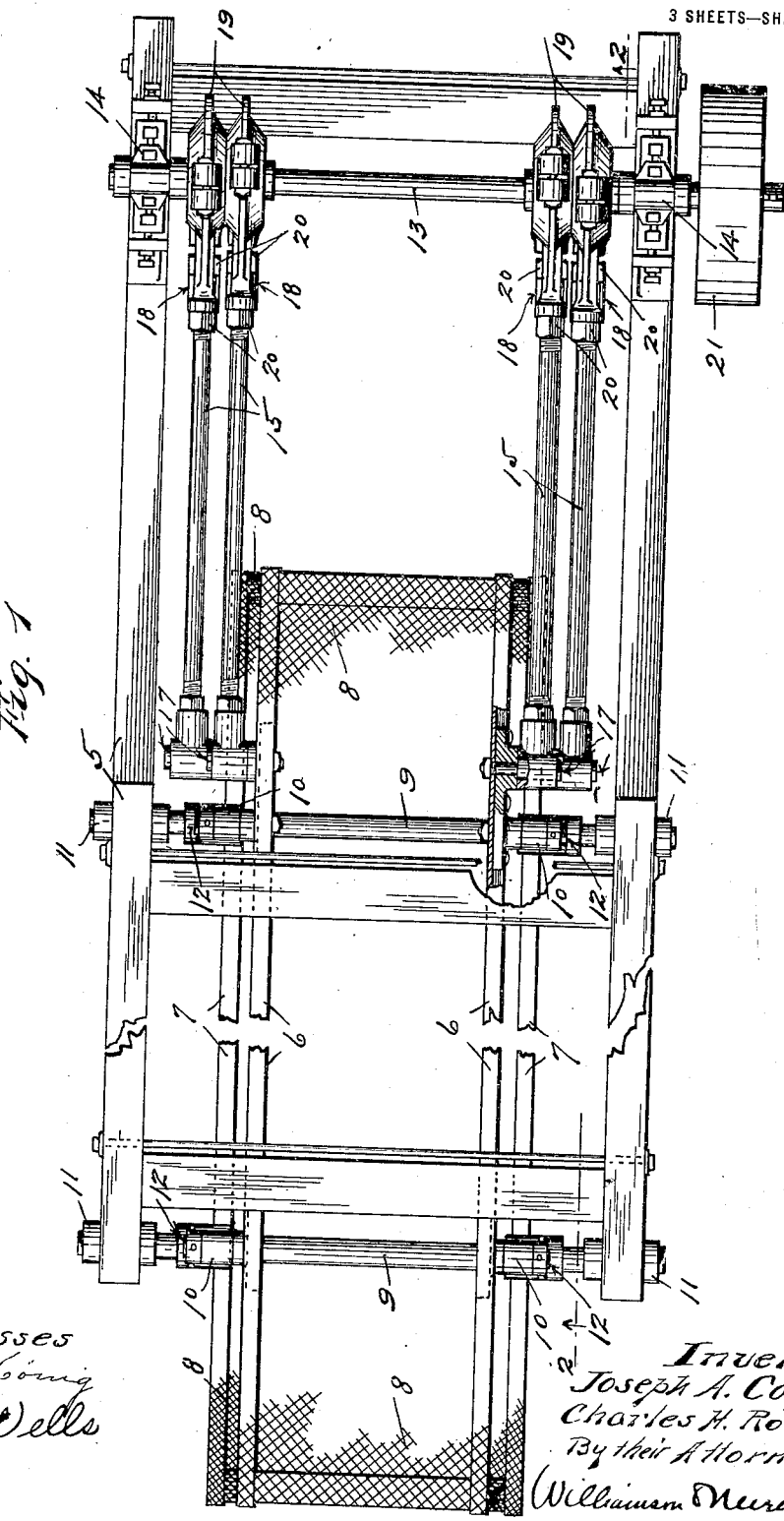
Figure 1 is a fragmentary plan view of the invention.
Figure 2:
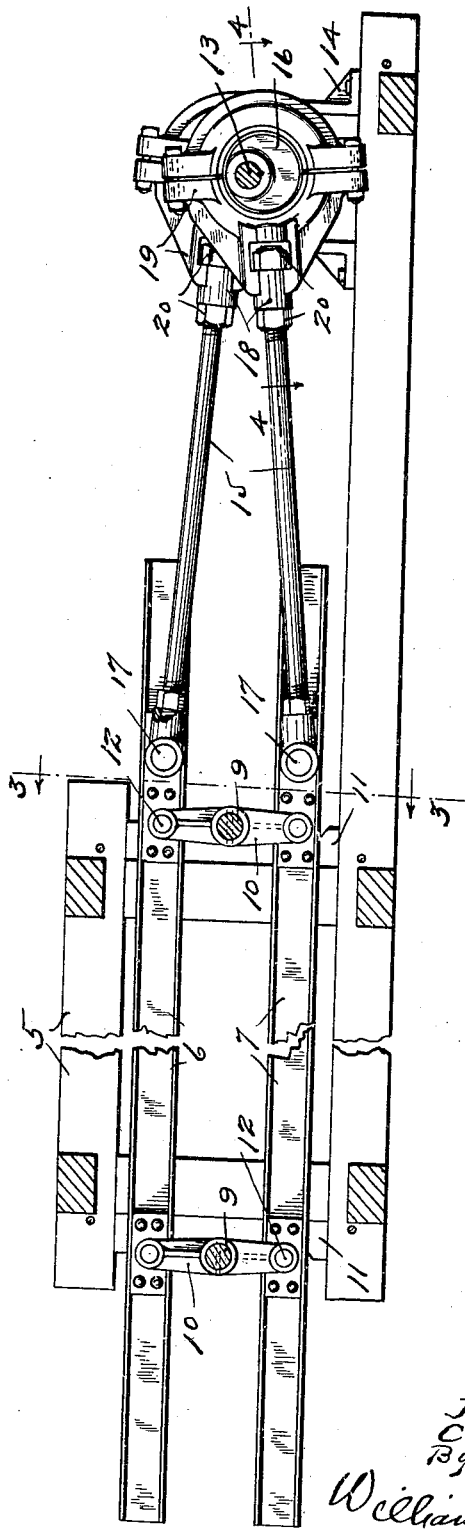
Fig. 2 is a longitudinal vertical section taken on the line 2—2 of Fig. 1.
Figure 3:
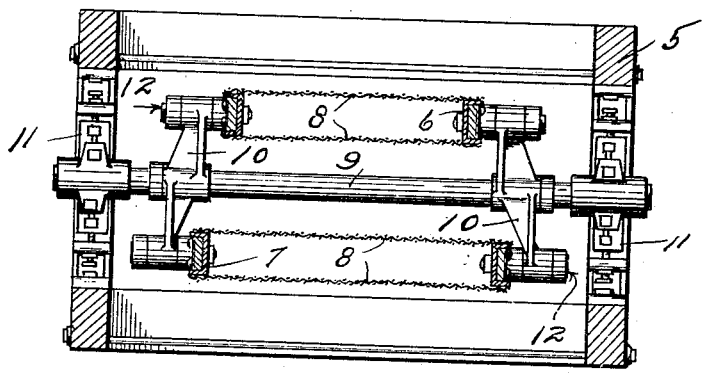
Fig. 3 is a transverse vertical section taken on the line 3—3 of Fig. 2.
Figure 4:
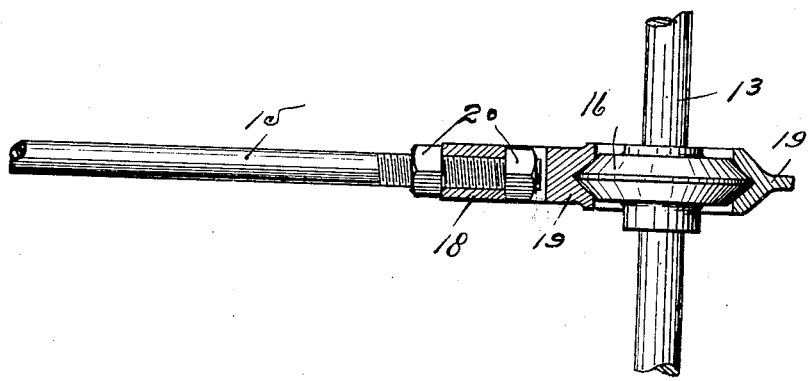
Fig. 4 is a detail view partly in plan and partly in horizontal section taken on the line 4—4 of Fig. 2, on an enlarged scale.

The numeral 5 indicates a heavy skeleton frame, within which is mounted upper and lower vertically spaced rectangular sieve frames 6 and 7, respectively. Each of these sieve frames carries two sieves 8 that are vertically spaced, the one above the other. To support the sieve frames 6 and 7 for reverse reciprocating movement, there is extended transversely therebetween two rock shafts 9 which carry upper and lower pairs of rocker arms 10. The rock shafts 9 are journaled in vertically adjustable upright bearings 11 secured to the main frame 5. Wrist pins 12 connect the outer ends of the arms 10 to the sieve frames 6 and 7.

To oscillate the sieve frames 6 and 7, a transverse driven shaft 13 is journaled in horizontally adjustable bearings 14 on the main frame 5 and each of said sieve frames is connected thereto by a pair of connecting rods 15 and a pair of eccentrics 16. The inner ends of the connecting rods 15 are secured to the sieve frames 6 and 7 by wrist pins 17 and their outer ends are screw-threaded and inserted through radially projecting sleeves 18 integrally formed with eccentric straps 19 mounted on the eccentrics 16. On the screw-threaded outer ends of the connecting rods 15 are opposing nuts 20, which bear against the ends of the respective sleeves 18 and adjustably connect said rods thereto. To prevent lateral movement of the eccentric straps 19 on the eccentrics 16, said eccentrics are provided with V-shaped peripheries which are seated in correspondingly formed circumferential channels in the eccentric straps. Keyed to the shaft 13, is a pulley 21 over which runs a belt, not shown, for driving the movable parts of the machine.

The four sieves 8 have a progressively fine mesh from the top sieve down, and, with the machine illustrated, five separations may be obtained, the first four passing over the sieves and the other or last passing through the lowermost sieve. Materials to be separated may be fed onto the uppermost sieve 8 by any suitable means, and by adjusting the bearing 11, the inclination of the sieves 8 may be varied, at will, to cause the materials on the several sieves to be discharged from either end thereof, when the operative length of the connecting rods 15 is the same. By adjusting the nuts 20 to increase the operative length of the connecting rods 15 of one of the sieve frames and by shortening the operative length of the connecting rods 15 of the other thereof, the lifting movement of the oscillating sieves may be increased to facilitate the separating action thereof. This same adjustment will also cause the material on the sieves to travel toward either end thereof, depending on the adjustments of the connecting rods. For instance, by increasing the operative length of the connecting rods for the upper sieve frame and decreasing the operative length of the lower sieve frame, the materials will be caused to travel toward the front end of the sieves. Likewise, by reversing this adjustment, the materials may be caused to travel toward the rear ends of said sieves.

By mounting the sieve frames on upper and lower rocker arms, the momentum of one of said frames will offset the momentum of the other thereof and thereby relieve the strain on the driving connections therefor, and also the reciprocating movement of one of the sieve frames will assist a like movement of the other.

What we claim is:—

The combination with a main frame, of vertically disposed rocker arms intermediately pivoted to the main frame, an upper sieve-equipped frame attached to the upper ends of the rocker arms, a lower sieve-equipped frame attached to the lower ends of the rocker arms, a driven shaft, a connecting rod secured to each sieve-equipped frame, oppositely disposed cranks independently securing each connecting rod to the driven shaft, and means for independently varying the operative lengths of the connecting rods, whereby the lifting movement of the two sieves may be varied, at will, and the direction of travel of the materials on said sieves may also be changed, at will.

In testimony whereof we affix our signatures in presence of two witnesses.

JOSEPH A. COYLE.
CHARLES H. ROTH.

Witnesses:
B. G. BAUMANN,
HARRY D. KILGORE.